United States Patent [19]

Gluekler et al.

[11] Patent Number: 4,650,642
[45] Date of Patent: Mar. 17, 1987

[54] HEAT DISSIPATING NUCLEAR REACTOR WITH METAL LINER

[75] Inventors: Emil L. Gluekler, San Jose; Anstein Hunsbedt, Los Gatos; Jonathan D. Lazarus, Sunnyvale, all of Calif.

[73] Assignee: The United States of America as represented by the United States Department of Energy, Washington, D.C.

[21] Appl. No.: 800,565

[22] Filed: Nov. 21, 1985

[51] Int. Cl.⁴ .............................................. G21C 9/00
[52] U.S. Cl. .................................... 376/280; 376/273; 376/293
[58] Field of Search ...................... 376/273, 280, 293

[56] References Cited

U.S. PATENT DOCUMENTS

| | | |
|---|---|---|
| 3,158,546 | 11/1964 | Cordova ............................. 376/273 |
| 3,607,630 | 9/1971 | West et al. . |
| 3,629,064 | 12/1971 | Zivi . |
| 3,719,556 | 3/1973 | Snyder, Jr. et al. . |
| 4,045,284 | 8/1977 | Rosewell ............................. 376/280 |
| 4,072,561 | 2/1978 | Friedrich ............................ 376/280 |
| 4,073,682 | 2/1978 | Barleon et al. . |
| 4,146,429 | 3/1979 | Slagley . |
| 4,240,875 | 12/1980 | Katscher ............................. 376/280 |
| 4,300,983 | 11/1981 | Dalledonne et al. ............... 376/280 |
| 4,313,795 | 2/1982 | Dauvergne . |
| 4,442,065 | 4/1984 | Latter et al. ....................... 376/280 |
| 4,464,333 | 8/1984 | Wohlsen ............................. 376/280 |

Primary Examiner—Deborah L. Kyle
Assistant Examiner—Richard W. Wendtland
Attorney, Agent, or Firm—L. E. Carnahan; Roger S. Gaither; Judson R. Hightower

[57] ABSTRACT

Disclosed is a nuclear reactor containment including a reactor vessel disposed within a cavity with capability for complete inherent decay heat removal in the earth and surrounded by a cast steel containment member which surrounds the vessel. The member has a thick basemat in contact with metal pilings. The basemat rests on a bed of porous particulate material, into which water is fed to produce steam which is vented to the atmosphere. There is a gap between the reactor vessel and the steel containment member. The containment member holds any sodium or core debris escaping from the reactor vessel if the core melts and breaches the vessel.

12 Claims, 1 Drawing Figure

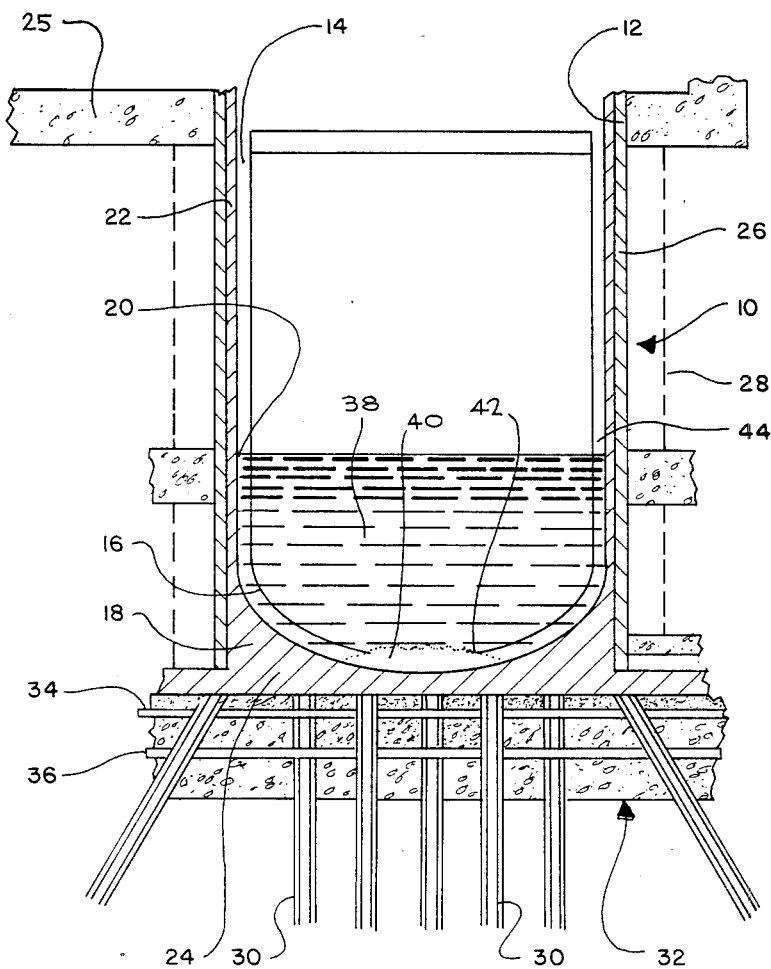

HEAT DISSIPATING NUCLEAR REACTOR WITH METAL LINER

GOVERNMENT RIGHTS

The invention described herein arose in the course of, or under, contract number DE-AT03-76SF71032 between the United States Department of Energy and the General Electric Corporation.

BACKGROUND OF THE INVENTION

1. Field of the Invention

This invention relates to nuclear reactors and protection of the public and, particularly, nuclear reactor containment structures which dissipate heat following an extremely low probability core meltdown and subsequent breach in the reactor vessel.

2. Background Discussion

Because of the radioactive materials contained in a nuclear reactor, great caution must be taken to prevent the escape of such materials to the environment. One type of nuclear reactor is the liquid metal fast-breeder reactor which employs a core immersed in liquid sodium coolant. If all heat removal capacity were lost, and temperatures within the reactor should exceed the melting point of the core, the core would disintegrate and core materials could reach the bottom of the reactor, where the debris layer heat generation rate could be sufficiently high to cause failure of the walls of the reactor vessel and guard vessel.

If this would occur both sodium and fragmented radioactive core debris would escape from the reactor vessel. The reactor containment must be designed to retain such radioactive materials which might penetrate the reactor vessel, and must prevent their entry into the environment where they can endanger public health and safety.

There is disclosed in U.S. patent application Ser. No. 800,566, filed Nov. 21, 1985 in the name of A. Hunsbedt, and J. D. Lazarus and entitled Heat Dissipating Nuclear Reactor, a novel reactor (herein referred to as Reactor I). This application disclosing Reactor I is incorporated herein by reference. The present invention provides an improvement in Reactor I.

BRIEF DESCRIPTION OF THE INVENTION

This improved version of Reactor I provides a reactor vessel disposed in a cavity lodged partly or completely below the surface of the earth, wherein the improvement is the use of a thick cast steel containment cavity surrounding the reactor vessel which cavity conforms closely in shape to the exterior of the reactor vessel and eliminates the guard vessel. This cast steel containment cavity has a thick steel base plate. In contrast to the Reactor I, wherein the containment cavity does not conform to the shape of the reactor vessel, the cast steel cavity described herein eliminates the mismatch between the round-bottomed reactor vessel and the flat-bottomed cavity. It fills in most of the void space between these two members with solid metal. In accordance with this invention, the debris is simply captured by the contoured containment cavity when there is a breach in the reactor vessel. The use of contoured cast steel containment greatly reduces the fall in sodium level occuring when sodium drains out of a breached reactor vessel. It provides a more coolable, safer reactor vessel.

Like the Reactor I, the improved reactor of this invention also has a hot zone beneath the basemat with means for introducing water and allowing steam formed to escape to the atmosphere. A plurality of metal pilings extend downwardly and outwardly into the earth from the basemat, supporting the reactor and serving as heat dissipating means.

BRIEF DESCRIPTION OF THE DRAWING

The FIGURE schematically illustrates the nuclear reactor containment of this invention, which is shown in crosssection with the reactor vessel breached and the radioactive core debris and liquid metal coolant being retained by the cast steel containment cavity.

DETAILED DESCRIPTION OF THE DRAWING

Referring to the FIGURE there is shown the nuclear reactor 10 of this invention disposed in a cavity 12 formed by excavating the earth. The reactor vessel 14 is generally cylindrical, but has a rounded bottom 16. The reactor vessel 14 is seated in a cast steel member 18 which has a interior contour 20 that conforms closely in shape to the exterior of the reactor vessel 14. This cast steel member 18 includes a thick, cylindrical sidewall 22 and a thick basemat 24 with flange members extending radially outwardly beyond the perimeter of the side wall. The sidewall thickness is nominally 8 inches and the basemat thickness is nominally 3 feet.

Like Reactor I, the reactor 10 of this invention has its top surrounded by a slab of concrete 25. The cavity wall is enwrapped by thermal insulation or a cooling jacket 26 and beyond this cooling jacket is biological shielding 28 such as concrete. The insulation or cooling jacket 26 prevents the shielding 28 and adjacent concrete structure from overheating. Like Reactor I there are a plurality of metal pilings 30 extending downwardly and outwardly into the earth. These pilings 30 are preferable in the form of H-Beams which are in intimate thermal contact with the basemat 24. The entire reactor 10 rests on a bed 32 of porous material and is essentially the same as the bed employed in Reactor I. There are two series of pipes 34 and 36 extending through it. The upper series of pipes serve as the steam vents and the lower series of pipes provide water to flood the bed 32. The water absorbs the heat in boiling, and carries it away via the steam which is vented by the second series of pipes to the atmosphere.

The principal advantage of this invention is that the guard vessel and reactor cavity are combined to provide a more compact and safer structure which holds the sodium 38 and core debris 40 as illustrated within the reactor 10 if the core melts and the reactor vessel subsequently breaches. This invention will improve the cooling of core debris when there is an overheating condition which the cooling means of this invention minimizes. As shown, there is a breach 42 in the reactor vessel 14 and the core debris 40 collects on the bottom of the cast steel member 18. The gap 44 between the reactor vessel 14 and the cast steel containment member 18 is of relatively small volume. If the reactor vessel is breached by a melted core, the resulting loss of liquid metal coolant from the reactor into this gap will result in only a small drop in sodium level. Reactor heat removal under these circumstances is via conduction down the pilings and steam generation, but may also be accomplished by the normal heat transfer members if they are operational; since the sodium level does not drop substantially as a result of reactor vessel breach, the normal heat exchangers and coolant circulation apparatus may still be submerged in sodium and may still be able to assist in cooling the melted core.

SCOPE OF THE INVENTION

The above description presents the best mode contemplated of carrying out the present invention as depicted by the embodiment disclosed. The features illustrated by this embodiment provide the advantages of this invention. This invention is, however, susceptible to modifications and alternate constructions from the embodiment shown in the drawing and description above. Consequently, it is not the intention to limit it to the particular embodiment disclosed. On the contrary, the intention is to cover all modifications and alternates falling within the scope of the invention as generally expressed by the following claims.

What is claimed is:

1. A nuclear reactor containment comprising:
   reactor vessel means disposed in a metal cavity located partially or completely below the surface of the earth in a cavity,
   a cast steel containment member partially surrounding the reactor vessel means and having an inner surface conforming in shape to an exterior surface of the reactor vessel means, said cast steel member having a solid thick base plate which extends at least across a bottom area of said reactor vessel means,
   means located below the base plate but adjacent to it for feeding water to a porous media disposed in the hot zone immediately underneath the base plate, said water being converted to steam when the temperature of the hot zone exceeds the boiling point of water,
   means of venting the steam so formed to the atmosphere, and
   means in contact with said base plate for supporting at least said base plate and for conducting heat away from said base plate.

2. The reactor of claim 1 wherein the cast steel member has a thick metal sidewall.

3. The reactor of claim 2 additionally including heat dissipating means positioned around at least said sidewall of the cast steel member.

4. The reactor of claim 1 wherein said means for supporting the base plate comprises a plurality of metal piling means in intimate thermal contact with said base plate and which extend downwardly and outwardly into the earth to support at least the base plate and conduct heat away from the reactor into underlying porous media and earth.

5. The reactor of claim 4 wherein the piling means are in the form of metal H-Beams.

6. In a nuclear reactor having a reactor vessel disposed in a cavity located at least partially below earth's surface, the improvement comprising:
   a cast steel containment member having a base plate section and a sidewall section with inner surfaces which conform in shape to an outer surface of the reactor vessel, said containment member being positioned adjacent to but spaced from the reactor vessel, and
   means in thermal contact with said base plate section for supporting same and for conducting heat therefrom.

7. The improvement of claim 6, wherein said base plate section of said containment member includes a flange member extending radially outwardly beyond a perimeter of said sidewall section.

8. The improvement of claim 6, additionally including means located below and adjacent to said base plate section for feeding water to a porous media disposed immediately beneath said base plate section, and means for venting any steam formed in said porous media.

9. The improvement of claim 6, wherein said base plate section has a thickness of about three feet, and wherein said sidewall section has a thickness of about eight inches.

10. The improvement of claim 6, wherein said means for supporting said base plate section comprises a plurality of metal pilings which extend downwardly and outwardly into earth beneath said base plate section, each of said plurality of metal pilings being in contract at one end thereof with said base plate section and additionally function to dissipate heat away from said base plate section.

11. The improvement of claim 10, wherein said metal pilings each are in the form of metal H-beams.

12. The improvement of claim 6, additionally including heat dissipating means positioned around at least said sidewall section of said containment member.

* * * * *